US010676001B2

(12) United States Patent
Baba et al.

(10) Patent No.: US 10,676,001 B2
(45) Date of Patent: Jun. 9, 2020

(54) BACK BOARD ATTACHMENT STRUCTURE AND VEHICLE SEAT

(71) Applicant: Adient Luxembourg Holding S.à r.l., Luxembourg (LU)

(72) Inventors: Kaoru Baba, Kanagawa (JP); Yoshihisa Hamano, Kanagawa (JP)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 86 days.

(21) Appl. No.: 15/761,601

(22) PCT Filed: Sep. 25, 2015

(86) PCT No.: PCT/JP2015/077041
§ 371 (c)(1),
(2) Date: Mar. 20, 2018

(87) PCT Pub. No.: WO2017/051466
PCT Pub. Date: Mar. 30, 2017

(65) Prior Publication Data
US 2018/0345836 A1    Dec. 6, 2018

(51) Int. Cl.
*B60N 2/58* (2006.01)

(52) U.S. Cl.
CPC ......... *B60N 2/5883* (2013.01); *B60N 2/5825* (2013.01); *B60N 2/5875* (2013.01); *B60N 2/5891* (2013.01)

(58) Field of Classification Search
CPC .. B60N 2/5883; B60N 2/5825; B60N 2/5875; B60N 2/5891
USPC ................................................... 297/452.38
See application file for complete search history.

(56) References Cited

FOREIGN PATENT DOCUMENTS

| CN | 101912208 A | 12/2010 |
|---|---|---|
| CN | 102197906 A | 9/2011 |
| CN | 202106890 U | 1/2012 |
| DE | 102012107598 A1 | 3/2013 |
| FR | 2997274 A1 | 5/2014 |
| JP | H083-08675 A | 11/1996 |
| JP | H09-150706 A | 6/1997 |
| JP | H10309220 A | 11/1998 |
| JP | 2006320611 A | 11/2006 |
| JP | 2009261443 A | 11/2009 |
| JP | 2009291599 A | 12/2009 |
| JP | 2011177198 A | 9/2011 |

(Continued)

OTHER PUBLICATIONS

The State Intellectual Property Office of People's Republic of China, The First Office Action issued in Application No. 201580083359.2, dated Dec. 3, 2019, 14 pages.

*Primary Examiner* — Mark R Wendell
(74) *Attorney, Agent, or Firm* — Marshall & Melhorn, LLC

(57) ABSTRACT

A seat back (2) has a pad (4) with a side surface covered by a trim cover (5) and a rear surface covered by a back board (6). A back board attachment structure has a folding portion (5a1) with a trim back surface edge portion (5a) folded back to a pad side. A fastener (7a) includes an element (7a2) attached to the folding portion (5a1) to face the pad side. An edge portion (6a) of a folding portion (6a1) of the back board (6), to be the backrest surface side, is folded back to the pad side. A fastener (7b) includes an element (7b2) attached to the folding portion (6a1) to face the pad side. The fasteners (7a and 7b) are engageable in a state with the trim cover provided from the backrest surface side and the back board provided from the back surface side, with respect to the pad.

2 Claims, 11 Drawing Sheets

(56) References Cited

FOREIGN PATENT DOCUMENTS

| JP | 2012-121421 A | 6/2012 |
|---|---|---|
| JP | 2013-60077 A | 4/2013 |

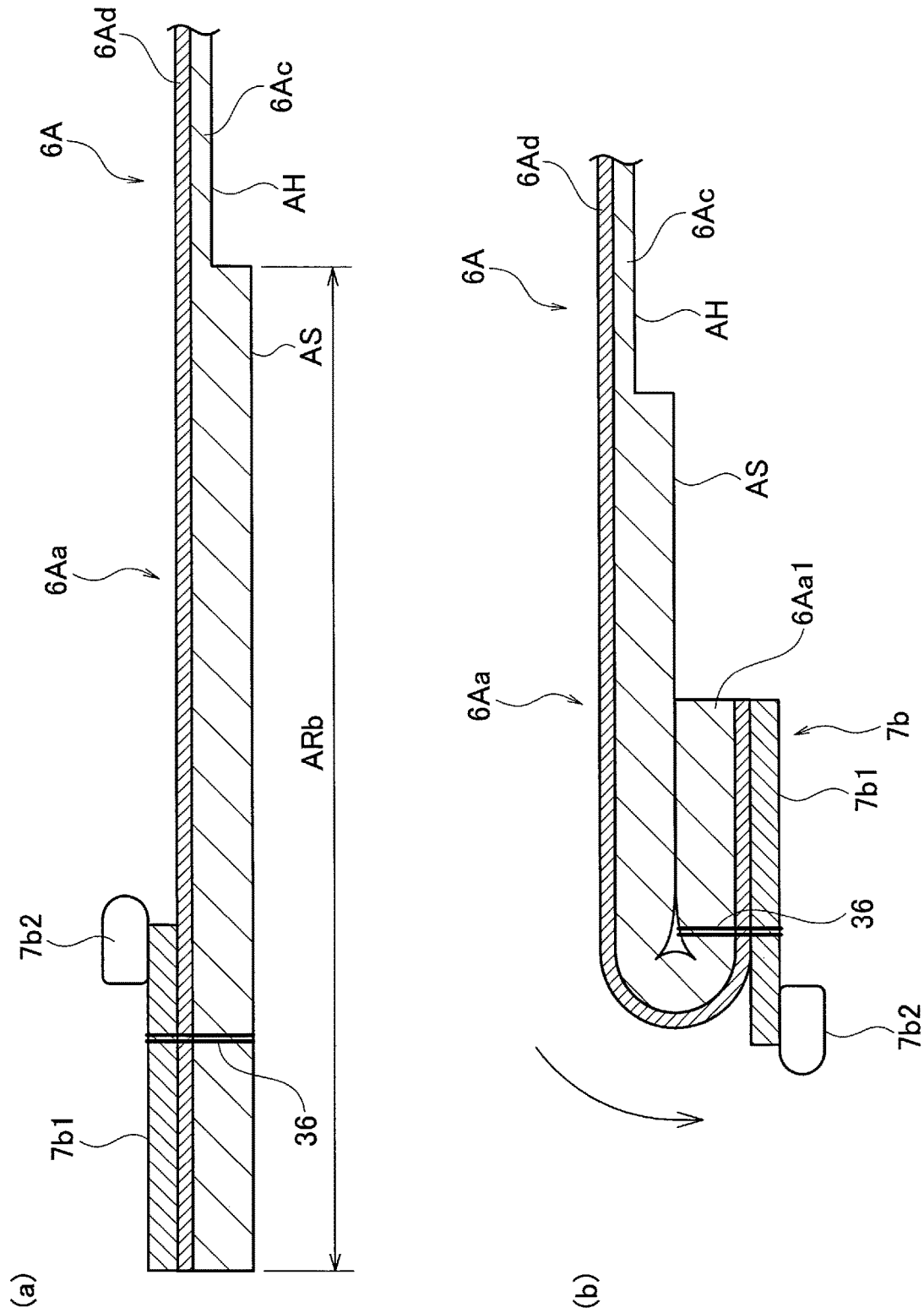

BACK BOARD ATTACHMENT STRUCTURE AND VEHICLE SEAT

CROSS REFERENCE TO RELATED APPLICATIONS

This application is a United States National Phase Application of International Application PCT/JP2015/077041, filed Sep. 25, 2015, the entire contents of which are incorporated herein by reference.

FIELD OF THE INVENTION

The present invention relates to a back board attachment structure and a vehicle seat, and in particular, to a back board attachment structure in a seat back of a vehicle seat.

BACKGROUND OF THE INVENTION

A back board attachment structure of a seat back in a vehicle seat is described in the patent document 1 (Japanese Patent Application Publication No. H8-308675). In the back board attachment structure as described in the patent document 1, a hook portion is provided on a back board in advance, and that hook portion is engaged with and supported by a wire member or the like of a seat back frame to be a framework of a seat back.

SUMMARY OF THE INVENTION

In the back board attachment structure as described in the patent document 1, the hook portion is provided, so that there is a need for a manufacturing process to form holes for screwing on the back board, or to form a shape dedicated for supporting the hook portion and the like. For this reason, it becomes high cost. Also, as there is a need to provide the hook portion at a position on an inner side separated from an outer edge of the back board, an operation to engage the hook portion with a wire and the like in the attachment operation of the back board is not necessarily easy, and there is a room for an improvement in this regard.

To this end, the present invention has an object to provide a back board attachment structure and a vehicle seat, in which the attachment operation of the back board is easy at low cost.

According to the first aspect of the present invention, there is provided a back board attachment structure in a seat back having a pad, a trim cover covering a backrest surface side of the pad, and a back board covering a back surface side opposite to the backrest surface side of the pad, the back board attachment structure having: a first folding portion in which an edge portion on the back surface side of the trim cover is folded back to the pad side; a first fastener having a first element, in which the first element is attached to the first folding portion to face the pad side; a second folding portion in which an edge portion to be the backrest surface side of the back board is folded back to the pad side; and a second fastener having a second element, in which the second element is attached to the second folding portion to face the pad side; wherein the first fastener and the second fastener are made to be capable of engaging in a state where the trim cover is provided from the backrest surface side with respect to the pad and the back board is provided from the back surface side with respect to the pad.

Also, according to the second aspect of the present invention, there is provided a vehicle seat equipped with a seat back, which is equipped with: a trim cover covering a backrest surface side of a pad of the seat back, and a back board coupled to the trim cover and covering a back surface side opposite to the backrest surface side of the pad, the vehicle seat having: a first folding portion in which an edge portion to be the back surface side of the trim cover is folded back to the pad side; a first fastener having a first element, in which the first element is attached to the first folding portion to face the pad side; a second folding portion in which an edge portion to be the backrest surface side of the back board is folded back to the pad side; and a second fastener having a second element, in which the second element is attached to the second folding portion to face the pad side; wherein the trim cover and the back board are coupled by engaging the first element and the second element.

According to the vehicle seat of the present invention, it is possible to obtain an effect that an attachment operation of the back board becomes easier at low cost.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 12 is a partial cross sectional view for explaining an attachment structure of the fastener 7b to a modified example of the back board 6A.

DESCRIPTION OF THE PREFERRED EMBODIMENTS

Embodiment 1

Figure 1:
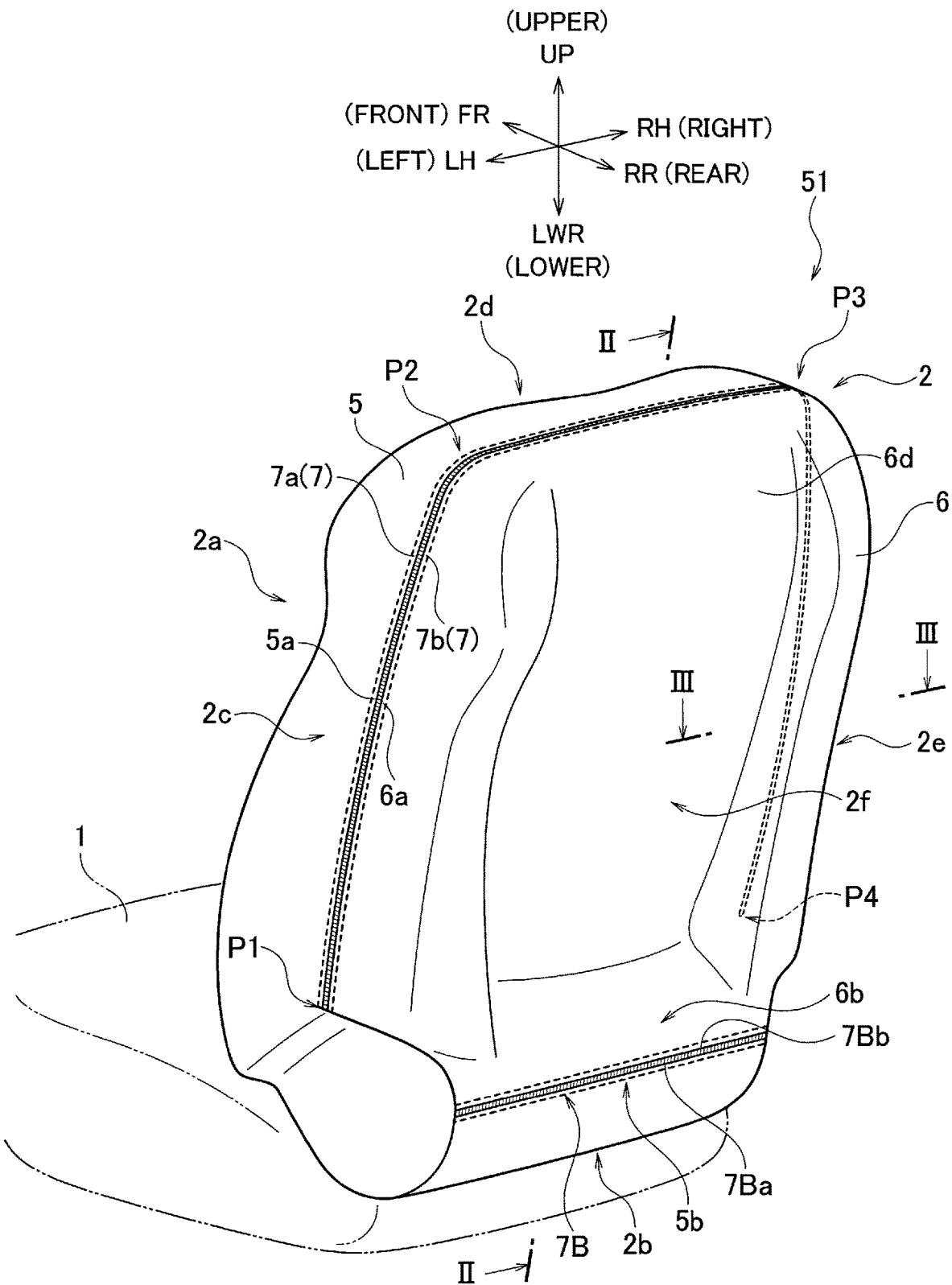
FIG. 1 is a perspective view for explaining a seat 51 that is an embodiment 1 of a vehicle seat according to one embodiment of the present invention.
Figure 2:
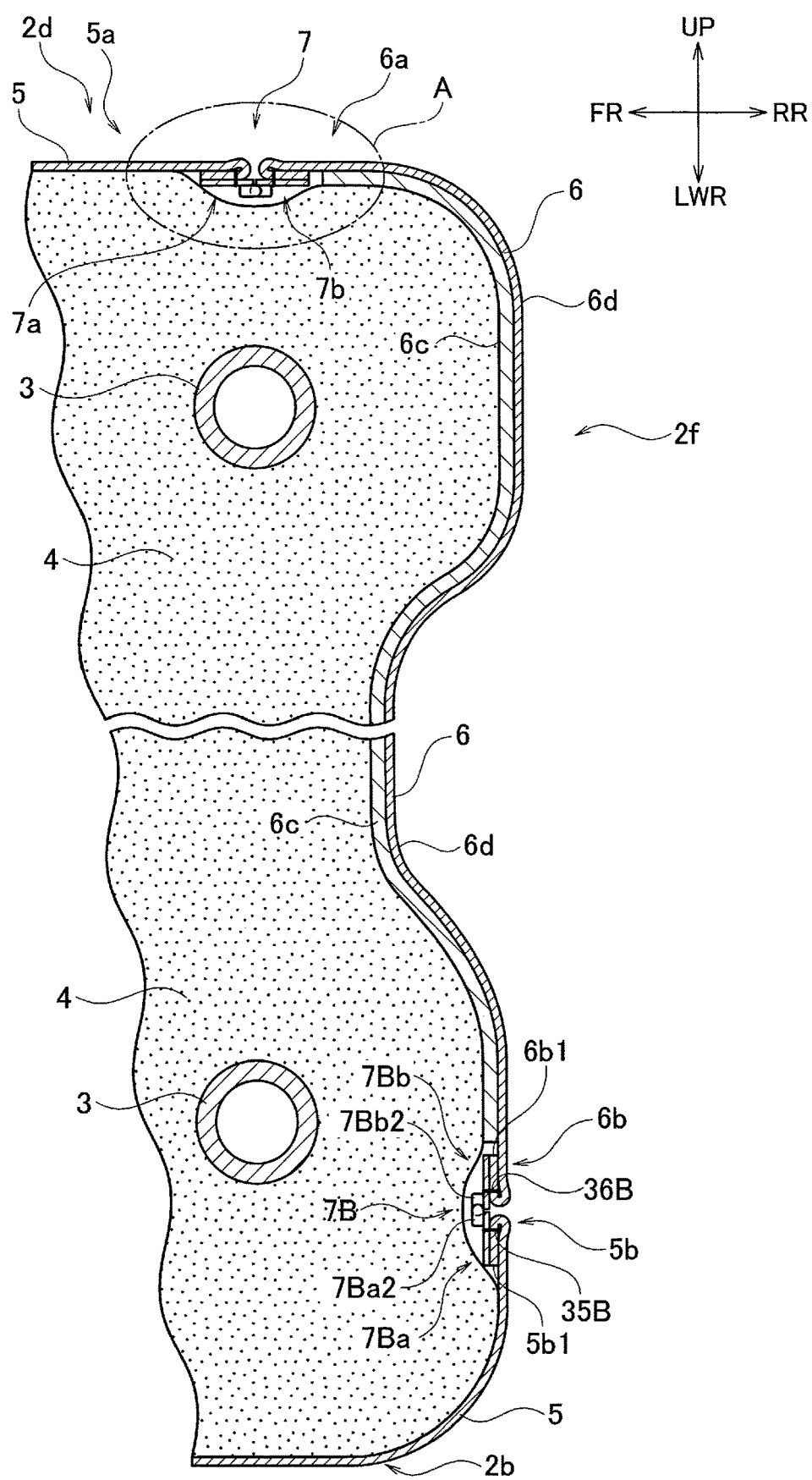
FIG. 2 is a cross sectional view along line II-II in FIG. 1.
Figure 3:
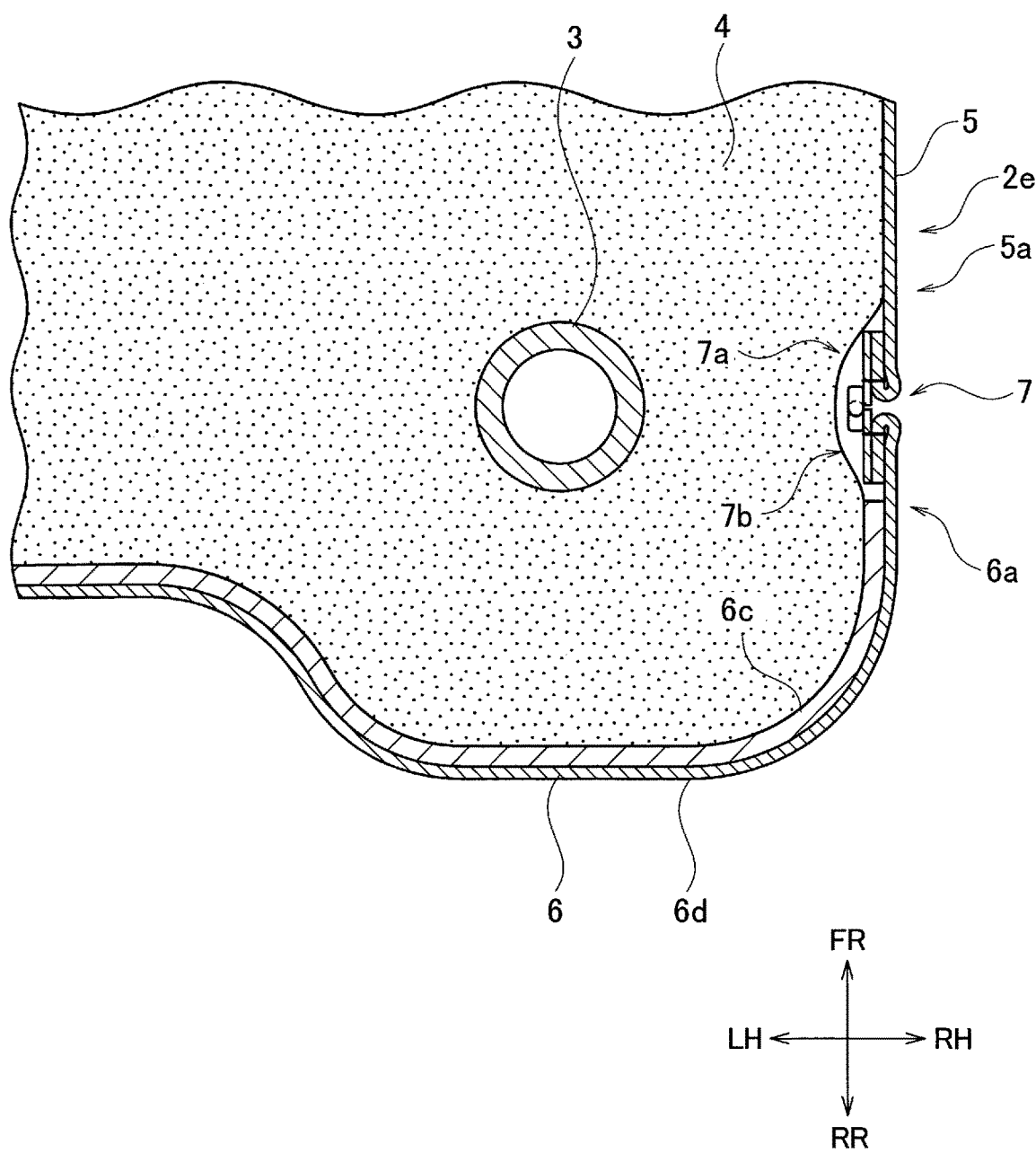
FIG. 3 is a cross sectional view along line III-III in FIG. 1.
Figure 4:
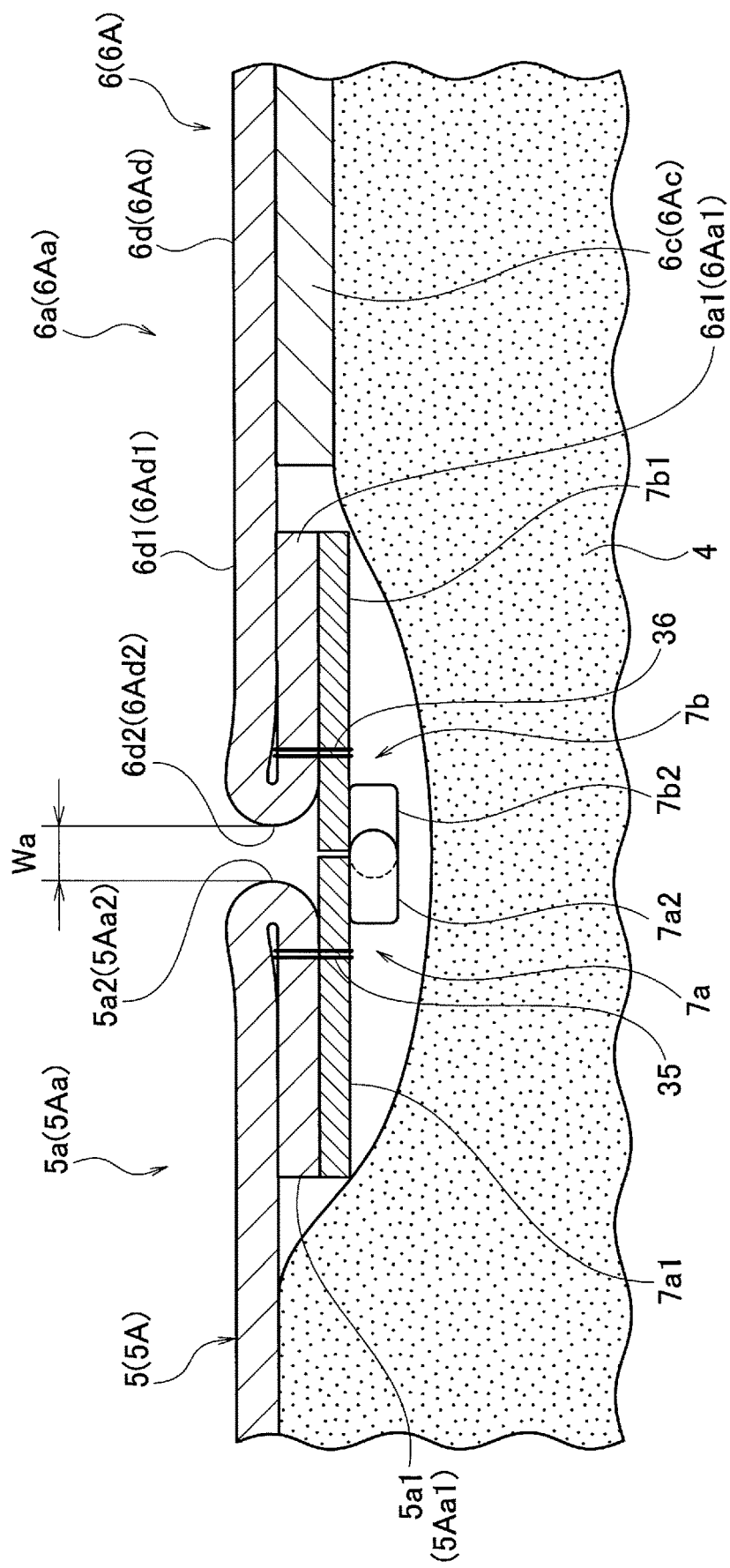
FIG. 4 is a partial cross sectional view for explaining an attachment structure of fasteners 7a, 7b used in the seat 51 (52)

An embodiment 1 of the vehicle seat according to one embodiment of the present invention is a seat 51. First, a configuration of the seat 51 will be described with references to FIG. 1 to FIG. 4. FIG. 1 is a perspective view looking from a left rear oblique upper side of the seat 51. In FIG. 1, a general vehicle moving forward direction is taken as a front, and front, rear, left, right, upper and lower directions are respectively defined as FR, RR, LH, RH, UP and LWR. The left and right directions will be a width direction of the seat 51. Examples of a vehicle include an automobile, a railway vehicle, an airplane, a ship, and the like. FIG. 2 is a partial cross sectional view (a longitudinal cross sectional view) at a II-II position in FIG. 1. FIG. 3 is a partial cross sectional view (a transverse cross sectional view) at a III-III position in FIG. 1. FIG. 4 is an enlarged view of an A section in FIG. 2.

The seat 51 is equipped with a seat cushion 1 to be a seat (shown in the figure by a two-dot chain line in FIG. 1) and a seat back 2 to be a backrest. The seat back 2 has a seat back frame 3 to be a framework and a soft pad 4 containing the seat back frame (see FIG. 2 and FIG. 3). Also, it has a trim cover 5 that is put on to cover a front side (a backrest surface side) of the pad 4, and a back board 6 that is attached to cover a rear side (a back surface side opposite to the backrest surface side) of the pad 4.

The trim cover 5 is formed from a known material such as a genuine leather, a synthetic leather, a fabric and the like. In detail, the trim cover 5 is formed to cover a bottom surface 2b, and a range up to a position that is somewhat deviated to a rear from a center in the front and back direction in a left side surface 2c, an upper surface 2d, and a right side surface 2e, when put on the pad 4 from a front surface 2a side of the seat back 2. The front surface 2a will be the backrest of the seat back 2, and the upper surface 2d will be a tip end surface of the seat back 2.

The trim cover 5 has a line fastener 7a (also referred to simply as a fastener 7a hereafter) that is an open fastener, attached to an edge portion 5a to be a rear side when put on the pad 4. The fastener 7a will be engaged or disengaged with a fastener 7b attached on the back board 6 side as will be described later. For the fasteners 7a, 7b, it is possible to use a Conceal fastener (where Conceal is a registered trademark) and the like.

In FIG. 4, a detailed configuration of an attachment portion of the fastener 7a is shown. The edge portion 5a of the trim cover 5 has a tip end portion that is made to be a folding portion 5a1, as it is folded back to the pad 4 side to be reversed. To a surface on the pad 4 side of the folding portion 5a1, a tape portion 7a1 of the fastener 7a is attached. A method of this attaching is the sewing by a sewing thread 35, for example.

The tape portion 7a1 has an element 7a2 attached to the tape portion 7a1, which is arranged to be positioned on the pad 4 side of a folding back ridgeline portion 5a2 side. Also, the folding back is made such that a position of the folding back ridgeline portion 5a2 becomes a position corresponding to a left and right direction position in FIG. 4 of the element 7a2 or a position close to that position.

Returning to FIG. 1, the fastener 7a is attached to a portion from a position P1 on a rear lower part in the left side surface 2c of the seat back 2, through a position P2 corresponding to a left upper shoulder and a position P3 corresponding to a right upper shoulder, to a position P4 on a rear lower part in the right side surface 2e.

Also, as shown in FIG. 1 and FIG. 2, a folding portion 5b1 is formed at an edge portion 5b on the bottom surface 2b side in the trim cover 5, similarly as the edge portion 5a, and a fastener 7Ba is attached. A method of this attaching is the sewing by a sewing thread 35B, for example. A Conceal fastener can be used for the fastener 7Ba as well.

As shown in FIG. 2, the back board 6 is formed three-dimensionally, with a rigidity at a level of not easily deformed manually. The back board 6 has a hard base material portion 6c, and a soft skin portion 6d provided to cover one surface of the base material portion 6c. One surface on which the skin portion 6d is provided is a surface to be a rear surface 2f in the seat back 2.

The back board 6 is formed three-dimensionally, to be able to cover the rear surface 2f of the seat back 2 and a rear side portion in the left side surface 2c, the upper surface 2d, and the right side surface 2e, in a state of being provided from a rear side with respect to the pad 4. The rear surface 2f of the seat back 2 is a surface to be an opposite side with respect to the front surface 2a to be the backrest surface.

The back board 6 has a line fastener 7b (also referred to simply as a fastener 7b hereafter) that is an open fastener which is engaged or disengaged (opened or closed) with respect to the fastener 7a, attached to an edge portion 6a to be a front side, when provided on the pad 4 from a rear side.

In detail, as shown in FIG. 4, on the edge portion 6a of the back board 6, the skin portion 6d is extended in a flange shape from the base material portion 6c to form a skin extended portion 6d1. Namely, the skin extended portion 6d1 is a portion at which the skin portion 6d is protruding from an end portion of the base material portion 6c. The skin extended portion 6d1 has its tip end portion folded back to an inner side (to the pad 4 side) to be reversed, to make a folding portion 6a1. To a surface on the pad 4 side of the folding portion 6a1, a tape portion 7b1 of the fastener 7b is attached. A method of this attaching is the sewing by a sewing thread 36, for example. The tape portion 7b1 has an element 7b2 attached to the tape portion 7b1, which is arranged to be positioned on the pad 4 side of a folding back ridgeline portion 6a2 side.

The base material portion 6c of the back board 6 is formed as a board made of a hard resin. For example, a hard resin material is formed into a three-dimensional shape by the injection molding. In more detail, the back board 6 in which the base material portion 6c and the skin portion 6d covering one surface side of the base material portion 6 are integrated can be formed, by making it to be the so called sheet inserting injection molding, in which the injection molding is carried out by inserting a soft resin sheet to be a raw material of the skin portion 6d within a cavity of the mold simultaneously with the base material portion 6c.

FIG. 5(a), (b) is a partial cross sectional view for explaining an exemplary method for attaching the tape portion 7b1 of the fastener 7b to the skin extended portion 6d1. When the left and right direction in FIG. 5(a) is taken as a width direction, a width W1 of the skin extended portion 6d1 is set to be twice or more, for example, of a width W2 of the tape portion 7b1 to be sewn.

First, as shown in FIG. 5(a), the tape portion 7b1 of the fastener 7b is sewn by the sewing thread 36 to an end portion on opposite side from the base material portion 6c in the skin extended portion 6d1 formed at the edge portion 6a. An orientation of the tape portion 7b1 is an orientation in which a position of the element 7b2 becomes a farther side from the end portion. Also, a sewing position in the width direction by the sewing thread 36 is a position as close to the element 7b2 as possible.

Figure 5:
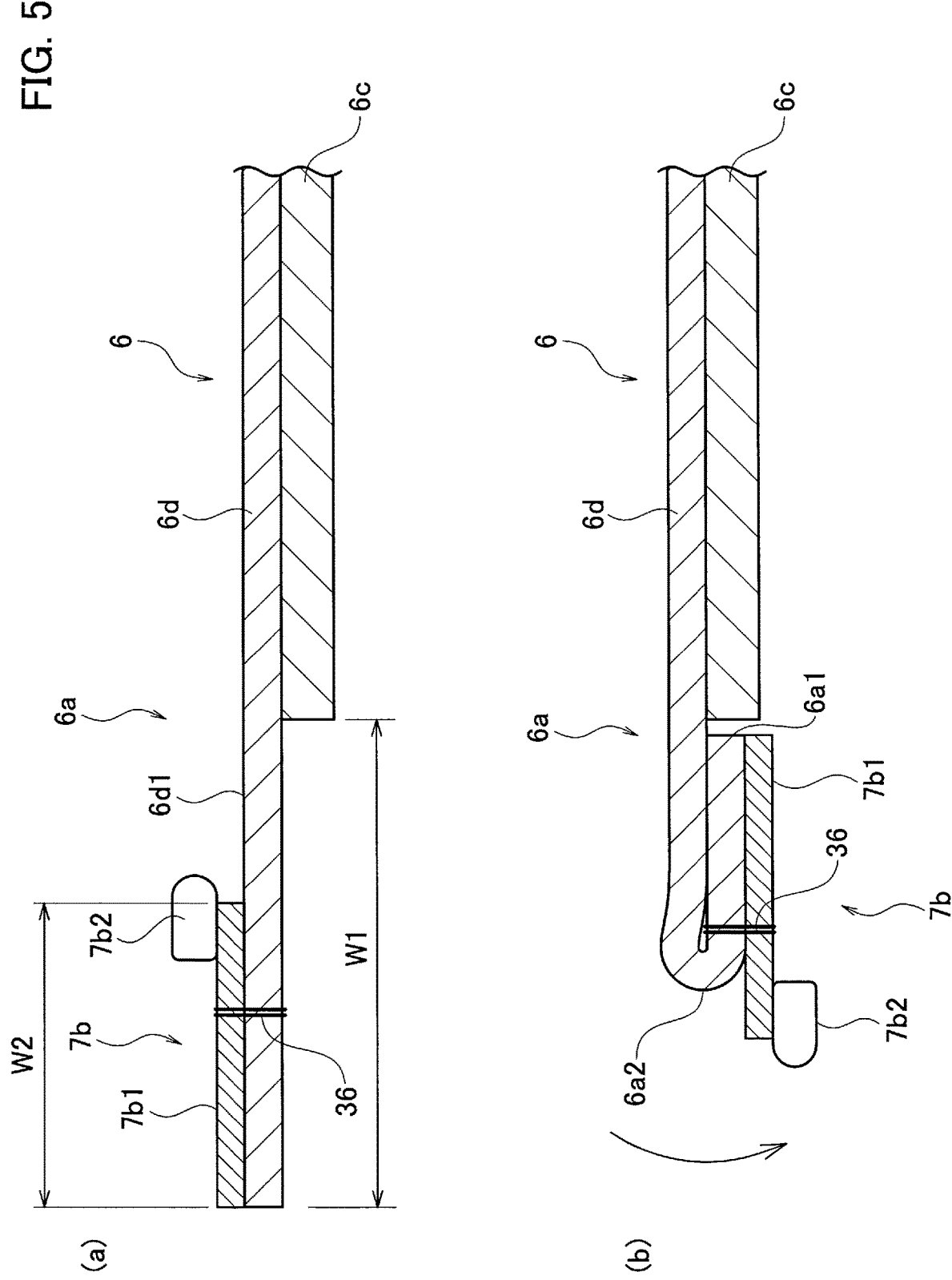
FIG. 5 is a partial cross sectional view for explaining an attachment method of the fastener 7b.

Next, as shown in FIG. 5(b), a portion corresponding to the tape portion 7b1 of the edge portion 6a is folded back to the pad 4 side (a lower side of FIG. 5) to be reversed (see an arrow), to form the folding portion 6a1. The folding back is made such that a left and right direction position in FIG. 5(b) of the folding back ridgeline portion 6a2 becomes a position corresponding to the element 7b2 of the fastener 7b or a position close to that position.

The attachment of the fastener 7a to the trim cover 5 is also carried out similarly as the above noted fastener 7b.

As shown in FIG. 2 and FIG. 4, the fastener 7b is provided to be facing against the fastener 7a, in a state where the back board 6 is provided from a rear side with respect to the pad 4. Then, the engagement or the disengagement of the element 7a2 and the element 7b2 is made possible by a slider (not shown in the figure) that is an opening and closing tool, so that the coupling or the separation of the fastener 7a and the fastener 7b becomes possible.

In the following, the fastener 7a and the fastener 7b in a state of being coupled will be referred to as a fastener portion 7. In FIG. 2 to FIG. 4, the fastener 7a and the fastener 7b are shown as the fastener portion 7. A position of a slider to be a starting point at a time of making the fastener portion 7 by engaging the fastener 7a and the fastener 7b is set to be the position P1 or the position P4.

Also, as shown in FIG. 1 and FIG. 2, a folding portion 6b1 is formed at an edge portion 6b on the bottom surface 2b side in the back board 6, similarly as the edge portion 6a, and a fastener 7Bb is attached. A method of this attaching is the sewing by a sewing thread 36B, for example. The fastener 7Bb is provided to be facing against the fastener 7Ba, in a state where the back board 6 is provided from a rear side with respect to the pad 4. Then, the engagement or the disengagement of the element 7Ba2 and the element 7Bb2 is made possible by a slider (not shown in the figure) that is an opening and closing tool, so that the coupling or the separation of the fastener 7Ba and the fastener 7Bb becomes possible. As shown in FIG. 1, the fastener 7Ba and the fastener 7Bb in a state of being coupled will be referred to as a fastener portion 7B.

As explained above, the trim cover 5 and the back board 6 can be integrated at least by engaging the fastener 7a and the fastener 7b to make the fastener portion 7. A position for engaging the fastener 7a and the fastener 7b is a position on an outer surface such as the left side surface 2c, the upper surface 2d, and the right side surface 2e of the seat 51, that is visually recognizable easily. By means of this, the attachment operation of the back board 6 is made to be very easy.

Embodiment 2

An embodiment 2 of the vehicle seat according to one embodiment of the present invention is a seat 52. The seat 52 differs from the seat 1 in that the back board 6 is replaced with a back board 6A and the fastener 7B is replaced with a hook engagement portion 8. First, one example of the manufacturing method for the back board 6A will be described with references to FIG. 6 to FIG. 8.

In this exemplary manufacturing method, a band sheet shaped base material 6Ac made of resin such as foam material of polyester, polyethylene, polypropylene, or polyurethane, and a skin material 6Ad made of a resin sheet will be used for the formation of the back board 6A. The back board 6A is formed from these raw materials in such a way that a band sheet shaped intermediate body 6AT formed by a raw sheet formation apparatus 10 shown in FIG. 6 is hot-pressed by a heating apparatus 26 and a molding machine 27, and then unnecessary portions on its periphery are cut by a cutting machine 28.

Figure 6:
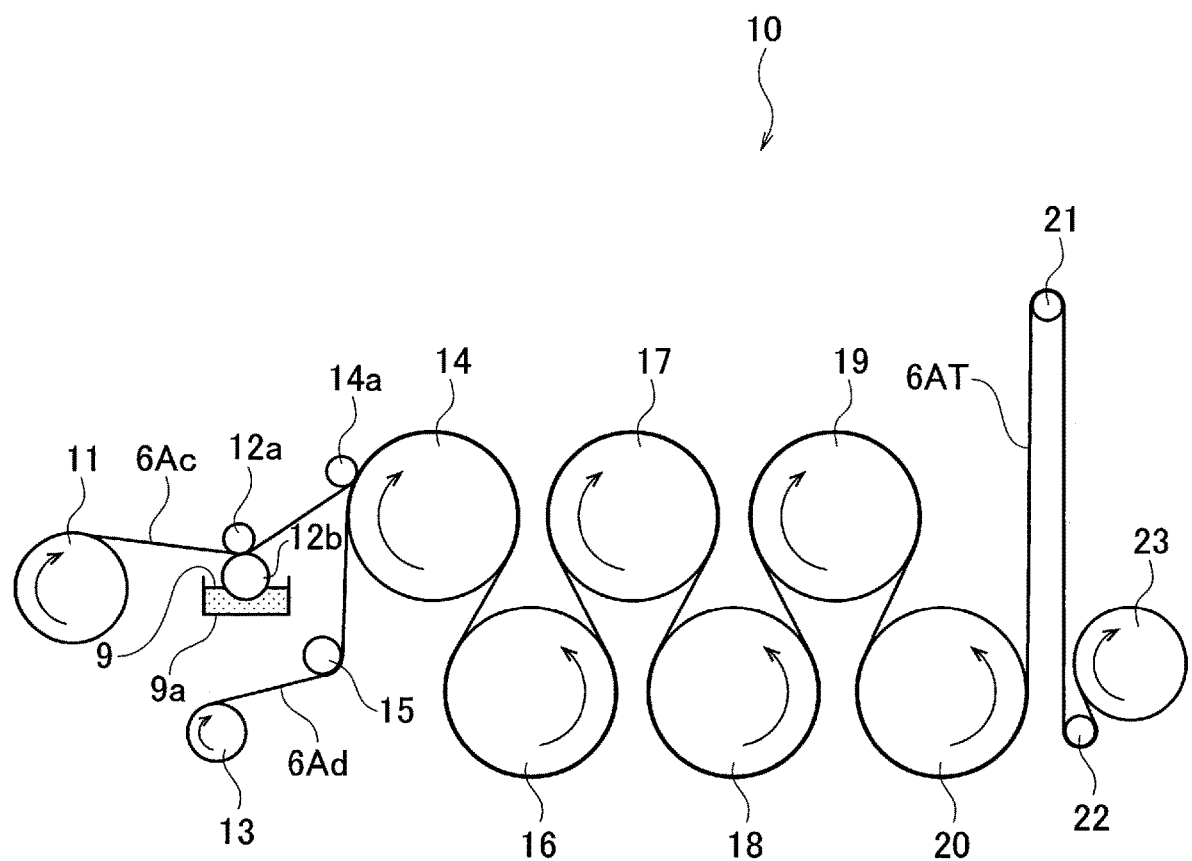
FIG. 6 is a first schematic diagram for explaining a formation process of a back board 6A equipped by a seat 52 that is an embodiment 2.

First, as shown in FIG. 6, at the raw sheet formation apparatus 10, the band sheet shaped base material 6Ac wound around a reel 11 is rolled out from the reel 11, and drawn between a pair of rollers 12a, 12b that are pressure contacting with each other and rotating. A lower part of the roller 12b is immersed into an adhesive 9 contained in a pool 9a. By means of this, one surface side (a lower surface side in FIG. 4) of the base material 6Ac is coated with the adhesive 9.

On the other hand, the band sheet shaped skin material 6Ad of the same width as the base material 6Ac are wound around a reel 13. The skin material 6Ad is rolled out from the reel 13, and drawn between a pair of rollers 14, 14a that are pressure contacting with each other and rotating, via a guide roller 15. Similarly, the base material 6Ac coated with the adhesive 9 is also drawn between the pair of rollers 14, 14a, with a surface coated with the adhesive 9 on the skin material 6Ad side, in superposition with the skin material 6Ad. By means of this, the base material 6Ac and the skin material 6Ad are superposed with the adhesive 9 in between.

Then, after taking out the base material 6Ac and the skin material 6Ad in a state of being superposed from the pair of rollers 14, 14a, they are conveyed by sequentially rolled around drying rollers 16-20. By means of this, the adhesive 9 is hardened to become an adhesive layer 9Ab (see FIG. 8), and the base material 6Ac and the skin material 6Ad are integrated via the adhesive layer 9Ab to become the band sheet shaped intermediate body 6AT.

After that, the intermediate body 6AT is wound around a product reel 23 via tensioning rollers 21, 22.

Figure 7:
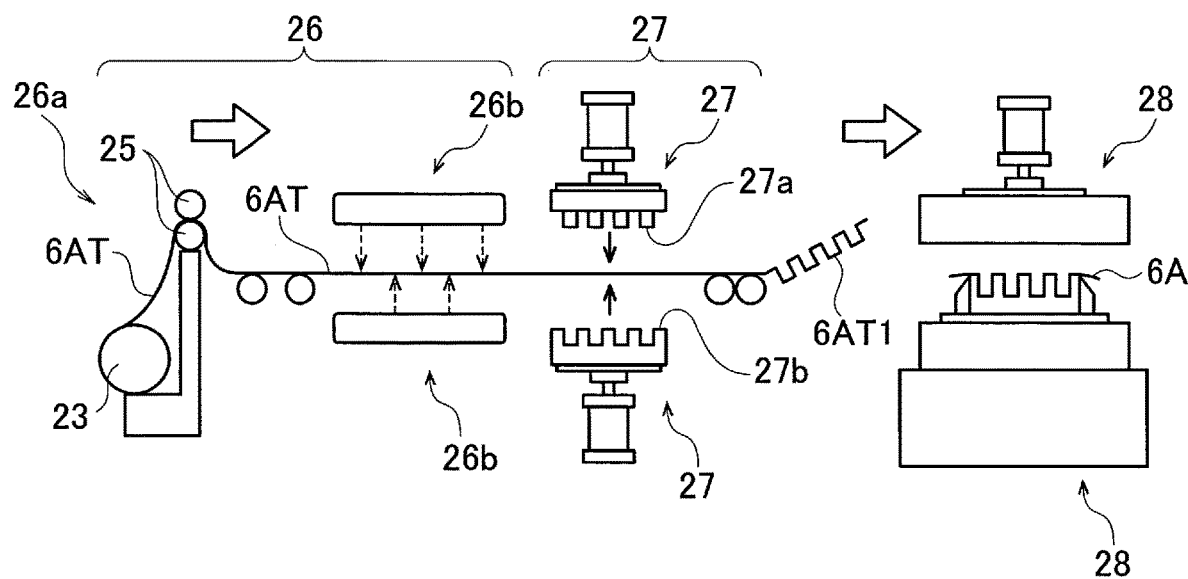
FIG. 7 is a second schematic diagram for explaining a formation process of the back board 6A.

Next, the product reel 23 around which the intermediate body 6AT is wound is loaded into a loading portion 26a of the heating apparatus 26, as shown in FIG. 7. The intermediate body 6AT is rolled out from the product reel 23, and passed between a pair of rollers 25, 25 that are pressure contacting with each other and rotating. Further, it is passed between a pair of heaters 26b, 26b that are spaced apart and arranged to be facing against each other in the upper and lower direction in FIG. 7. The heater 26b is a ceramic heater, for example. The intermediate body 6AT is heated while passing between the heaters 26b, 26b, to be softened to a level of easily deformable by an external force.

Next, the softened intermediate body 6AT is conveyed into the molding machine 27. The molding machine 27 has a male mold 27a and a female mold 27b that are spaced apart in the upper and lower direction in FIG. 7. The male mold 27a and the female mold 27b have surface shapes corresponding to a shape of the back board 6A which is a product to be molded.

The molding machine 27 compresses and deforms the intermediate body 6AT entered between the male mold 27a and the female mold 27b by pressing in the upper and lower direction. In detail, the intermediate body 6AT is deformed into a three-dimensional shape and a thickness in accordance with the surface shapes of the respective molds 27a, 27b and a minimum gap between the male mold 27a and the female mold 27b at a time of pressing. In FIG. 7, the case where the intermediate body 6AT is press molded in convex and concave shapes to become a molded intermediate body 6AT1 is shown.

Finally, the unnecessary portions of the molded intermediate body 6AT1 are cut and removed by the cutting machine 28, to obtain the back board 6A that is the product. In the following, a portion formed with the base material 6Ac will be referred to as the base material portion 6Ac in the back board 6A as the product. Also, a portion formed with the skin material 6Ad will be referred to as the skin portion 6Ad.

At the molding machine 27, the minimum gap between the male mold 27a and the female mold 27b at a time of pressing is set in plurality in accordance with portions of the back board 6A to be molded. Namely, the minimum gap between the male mold 27*a* and the female mold 27*b* at a time of pressing is set to have at least two different gaps for a portion at which it is a prescribed value (referred to as a metal mold strong press portion) and a portion at which it is greater (wider) than that prescribed value (referred to as a metal mold weak press portion).

In detail, a portion at which the intermediate body 6AT is pressed at the metal mold weak press portion (referred to simply as a weak press portion) has a less amount of compression (a lower compression level) for the base material portion 6Ac than a portion at which it is pressed at the metal mold strong press portion (referred to simply as a strong press portion), to become a softer and thicker portion. Conversely, the strong press portion has a more amount of compression (a higher compression level) for the base material portion 6Ac than the weak press portion, to become a harder and thinner thickness portion. Also, it is possible for the weak press portion to have a softness of a level that enables the sewing and the folding, by setting in advance a gap for the metal mold weak press portion at a time of pressing to be wider to some extent.

By means of this, desired hardness and rigidity can be given to each region with respect to the back board 6A, by setting the metal mold strong press portion in correspondence to the molding of a portion (a region) at which the high strength is necessary as the back board 6A, and setting the metal mold weak press portion in correspondence to a portion (a region) desired to obtain a cushioning effect or a portion (region) to be sewn.

Figure 8:
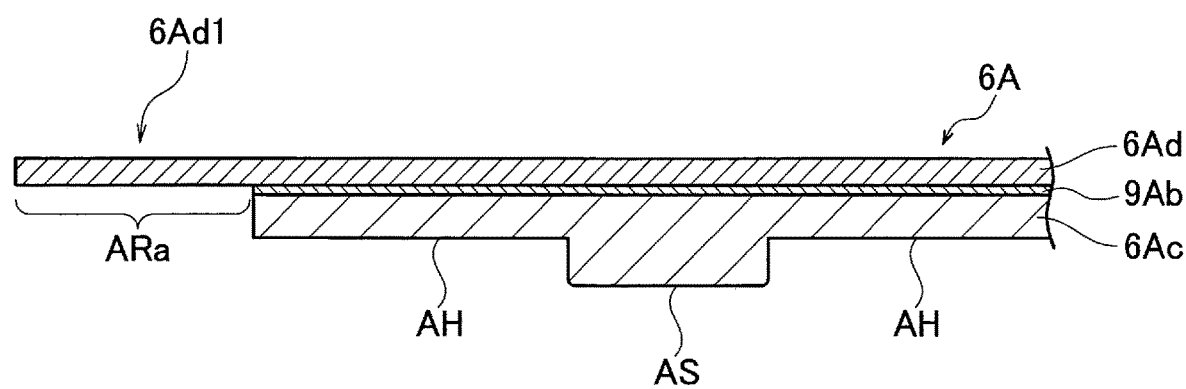
FIG. 8 is a partial cross sectional view for explaining the back board 6A.

As shown in FIG. 8, the strong press portion formed in the back board 6A is indicated as a strong press portion AH, and the weak press portion is indicated as a weak press portion AS. Also, in the case of forming the skin extended portion 6Ad1 in which only the skin portion 6Ad is extended outward at the edge portion of the back board 6A, the base material portion 6Ac and the adhesive layer 9Ab are removed in a prescribed range ARa from an end portion, by a secondary operation, for example. Namely, the skin extended portion 6Ad1 is formed as a portion at which the skin portion 6Ad is protruding from an end portion of the base material portion 6Ac.

Figure 9:
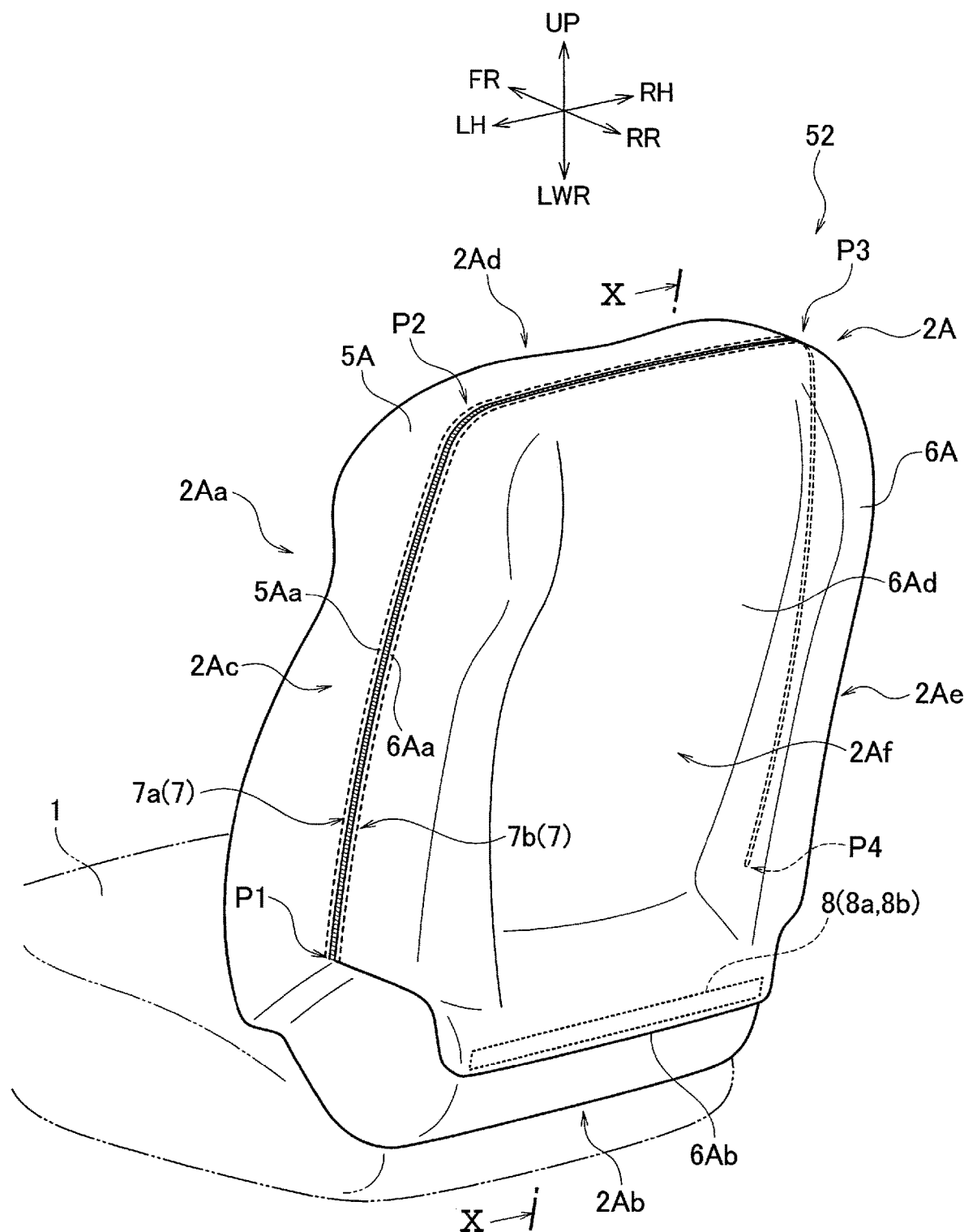
FIG. 9 is a perspective view for explaining the seat 52.
Figure 10:
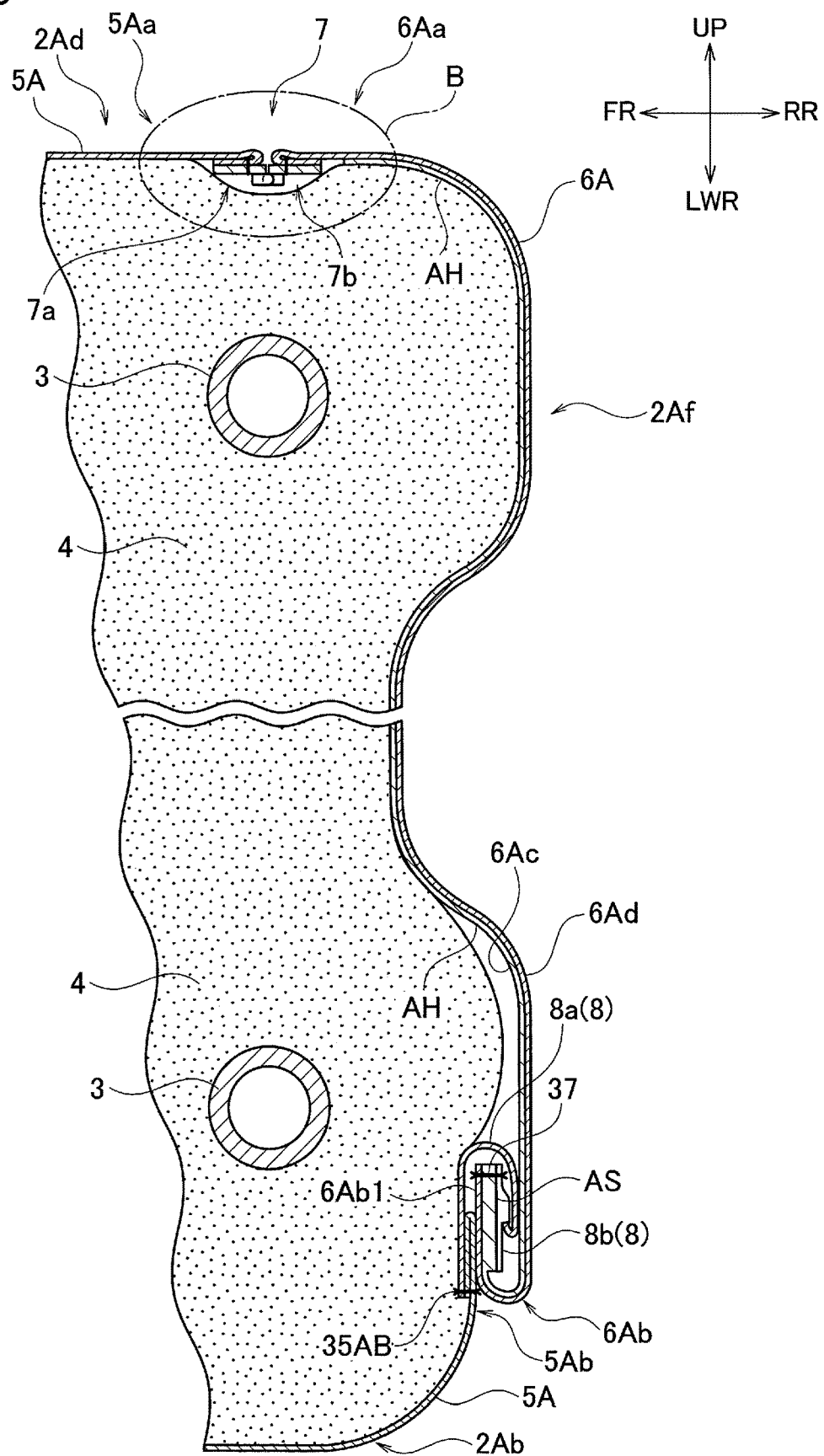
FIG. 10 is a cross sectional view along a X-X line in FIG. 9.

A configuration of the seat 52 using the back board 6A as described above will be described with references to FIG. 9 and FIG. 10. FIG. 9 is a perspective view looking from a left rear oblique upper side of the seat 52. FIG. 10 is a partial cross sectional view (a longitudinal cross sectional view) at a X-X position in FIG. 9. An enlarged view of a B section in FIG. 10 is equivalent to FIG. 4 in shape, so that reference signs of corresponding members are indicated in parentheses in FIG. 4 and will be described with references to FIG. 4. Note that the adhesive layer 9Ab is omitted in FIG. 4 and FIG. 10 to FIG. 12.

As shown in FIG. 9, the seat 52 is equipped with the same seat cushion 1 as the seat 51, and a seat back 2A to be a backrest. In the seat back 2A, the trim cover 5 and the back board 6 are replaced with a trim cover 5A and a back board 6A respectively, with respect to the seat back 2 in the seat 51.

As shown in FIG. 10, the trim cover 5A has a fastener 7*a* similarly as the trim cover 5, and a hook 8*a* is attached instead of the fastener 7Ba on the bottom surface 2*b* side.

Namely, as shown in FIG. 4, on an edge portion 5Aa of the trim cover 5A, a folding portion 5Aa1 that is folded back to the pad 4 side to be reversed is formed.

To a surface to be the pad 4 side in the folding portion 5Aa1, a tape portion 7*a*1 of the fastener 7 is attached. A method of this attaching is the sewing by a sewing thread 35, for example. Also, the folding back is made such that a position of the folding back ridgeline portion 5Aa2 becomes a position corresponding to a left and right direction position in FIG. 4 of the element 7*a*2 of the fastener 7*a* or a position close to that position.

Also, as shown in FIG. 10, on the edge portion 5Ab on the bottom surface 2Ab side in the trim cover 5A, the hook 8*a* of a convex side to make uneven part engagement, with respect to a hook receiving portion 8*b* provided on the back board 6A side as will be described later, the hook 8*a* of a convex side to make an uneven parts engaging is sewn by a sewing thread 35AB.

The back board 6A has a vicinity of the edge portion on the bottom surface 2Ab side as the weak press portion AS along that edge portion, and the other portion as the strong press portion AH. Similarly as the back board 6, the back board 6A is formed three-dimensionally, to be able to cover the rear surface 2*f* of the seat back 2 and a rear side portion in the left side surface 2*c*, the upper surface 2*d*, and the right side surface 2*e*, in a state of being provided from a rear side with respect to the pad 4.

Furthermore, the back board 6A has the fastener 7*b* that is engaged or disengaged (opened or closed) with respect to the fastener 7*a*, attached to an edge portion 6Aa to be a front side, when provided from a rear side with respect to the pad 4.

In detail, as shown in FIG. 4, on the edge portion 6Aa of the back board 6A, the skin extended portion 6Ad1 at which the base material portion 6Ac is absent and only the skin portion 6Ad is protruding is formed, as described with reference to FIG. 8. The skin extended portion 6Ad1 has its tip end portion made to be a folding portion 6Aa1 that is folded back to the pad 4 side to be reversed. To a surface on the pad 4 side of the folding portion 6Aa1, a tape portion 7*b*1 of the fastener 7*b* is attached. A method of this attaching is the sewing by a sewing thread 36, for example. An orientation of the tape portion 7*b*1 is made to be such an orientation that the element 7*b*2 attached to the tape portion 7*b*1 is positioned on the pad 4 side of a folding back ridgeline portion 6Aa2 side. Also, the folding back is made such that a position of the folding back ridgeline portion 6Aa2 becomes a position corresponding to a left and right direction position in FIG. 4 of the element 7*b*2 of the fastener 7*b* or a position close to that position.

The fastener 7*b* is provided to be facing against the fastener 7*a*, in a state where the back board 6 is provided from a rear side with respect to the pad 4. Then, the engagement or the disengagement of the element 7*a*2 and the element 7*b*2 is made possible by a slider (not shown in the figure), so that the coupling or the separation of the fastener 7*a* and the fastener 7*b* becomes possible. A position of an opening tool of the fastener to be a starting point at a time of making the fastener portion 7 by engaging the fastener 7*a* and the fastener 7*b* is set to be the position P1 or the position P4, similarly as the seat 51.

As shown in FIG. 9 and FIG. 10, the back board 6A has the hook receiving portion 8*b* for locking with the hook 8*a* provided on the trim cover 5A side, which is attached to the edge portion 6Ab to be a lower side.

In detail, on the edge portion 6Ab on the bottom surface 2AB side of the back board 6A, the weak press portion AS is formed. Then, the edge portion 6AB has a range containing that weak press portion AS to be the folding portion 6Aa1 that is folded from the pad 4 side to be reversed upward. In the folding portion 6Ab1, the weak press portion AS is protruding to an outer side (an opposite side of the pad 4), and to a surface to be that outer side, the hook receiving portion 8n is attached. A method of this attaching is the sewing by a sewing thread 37, for example.

The hook 8a and the hook receiving portion 8b may not be one set extending in the left and right direction. They may be provided in plural sets that are attached to be separated in the left and right direction.

With respect to the pad 4, when the trim cover 5A is put on from a front side and back board 6A is provided from a rear side, the fastener 7a and the fastener 7b are facing against each other in proximity. These fastener 7a and fastener 7b are engaged by moving a slider (not shown in the figure) that is an opening and closing tool, to make the fastener portion in the coupling state. By means of this, the back board 6A is integrated with the trim cover 5A.

Also, at a lower part in the rear surface 2Af, the hook 8a of the trim cover 5A is hooked and locked to the hook receiving portion 8n of the back board 6A, such that a hook engagement portion 8 in which the hook 8a and the hook receiving portion 8b are integrated is configured.

By means of this, the trim cover 5A and the back board 6A are more firmly integrated. In the seat 52, the back board 6A is attached as an outward appearance visible member to the rear surface 2Af side to be a back surface of the seat back 2.

As explained above, the trim cover 5A and the back board 6A can be integrated at least by engaging the fastener 7a and the fastener 7b to make the fastener portion 7. A position for engaging the fastener 7a and the fastener 7b is a position on an outer surface such as the left side surface 2Ac, the upper surface 2Ad, and the right side surface 2Ae of the seat 52, that is visually recognizable easily. By means of this, the attachment operation of the back board 6A is made to be very easy.

In the following description, the reference signs of the embodiment 2 are also noted in parentheses.

As described in detail up to here, the seat 51 (52) of the embodiment 1 (2) has no need to form holes for screwing on the back board 6 (6A). Also, with respect to the back board 6 (6A), it is not independently requiring a process for forming a shape dedicated to support the hook portion. For this reason, the seat 51 (52) can be formed by suppressing the high cost.

Also, the back board 6 (6A) and the trim cover 5 (5A) can be integrated by engaging the fastener 7a and the fastener 7b. A position for engaging the fastener 7a and the fastener 7b is a position on an outer surface such as the left side surface 2c (2Ac), the upper surface 2d (2Ad), and the right side surface 2e (2Ae) of the seat 51 (52), that is visually recognizable easily. By means of this, the attachment operation of the back board 6 (6A) is made to be very easy.

Also, the fastener 7a and the fastener 7b are Conceal fasteners, and their tape portions 7a1, 7b1 are attached such that the element 7a2 and the element 7b2 are facing against each other by positioning on the pad 4 side, on the inner surfaces (surfaces on the pad 4 side) of the folding portions 5a1 (5Aa1), 6a1 (6Aa1). Also, the folding back ridgeline portions 5a2 (5Aa2), 6a2 (6Aa2) are positioned in proximity to the elements 7a2, 7b2.

By means of this, in a state of the fastener portion 7 in which the fastener 7a and the fastener 7b are engaged and coupled, a gap Wa (see FIG. 4 and FIG. 11) between the edge portion 5a (5Aa) of the trim cover 5 (5A) and the skin portion 6d (6Ad) of the back board 6 (6A) becomes quite small. More specifically, it almost becomes a level of a width when the element 7a2 and the element 7b2 are engaged.

For this reason, the coupling portion of the trim cover 5 (5A) and the back board 6 (6A) is not noticeable, and a shape continuity of the outer surface of the trim cover 5 (5A) and the outer surface of the back board 6 (6A) is more strongly visually recognizable, so that the outward appearance quality is improved.

Also, in the embodiment 1, the bottom surface 2b sides of the trim cover 5 and the back board 6 are also integrated as the fastener 7B by the engagement of the fastener 7Ba and the fastener 7Bb. Also, in the embodiment 2, the bottom surface 2Ab sides of the trim cover 5A and the back board 6A are also integrated as the hook engagement portion 8 by the engagement of the hook 8a and the hook receiving portion 8b. By means of this, the trim cover 5 (5A) and the back board 6 (6A) are more firmly integrated, while their integration operation becomes easier.

Modified Example

Figure 11:
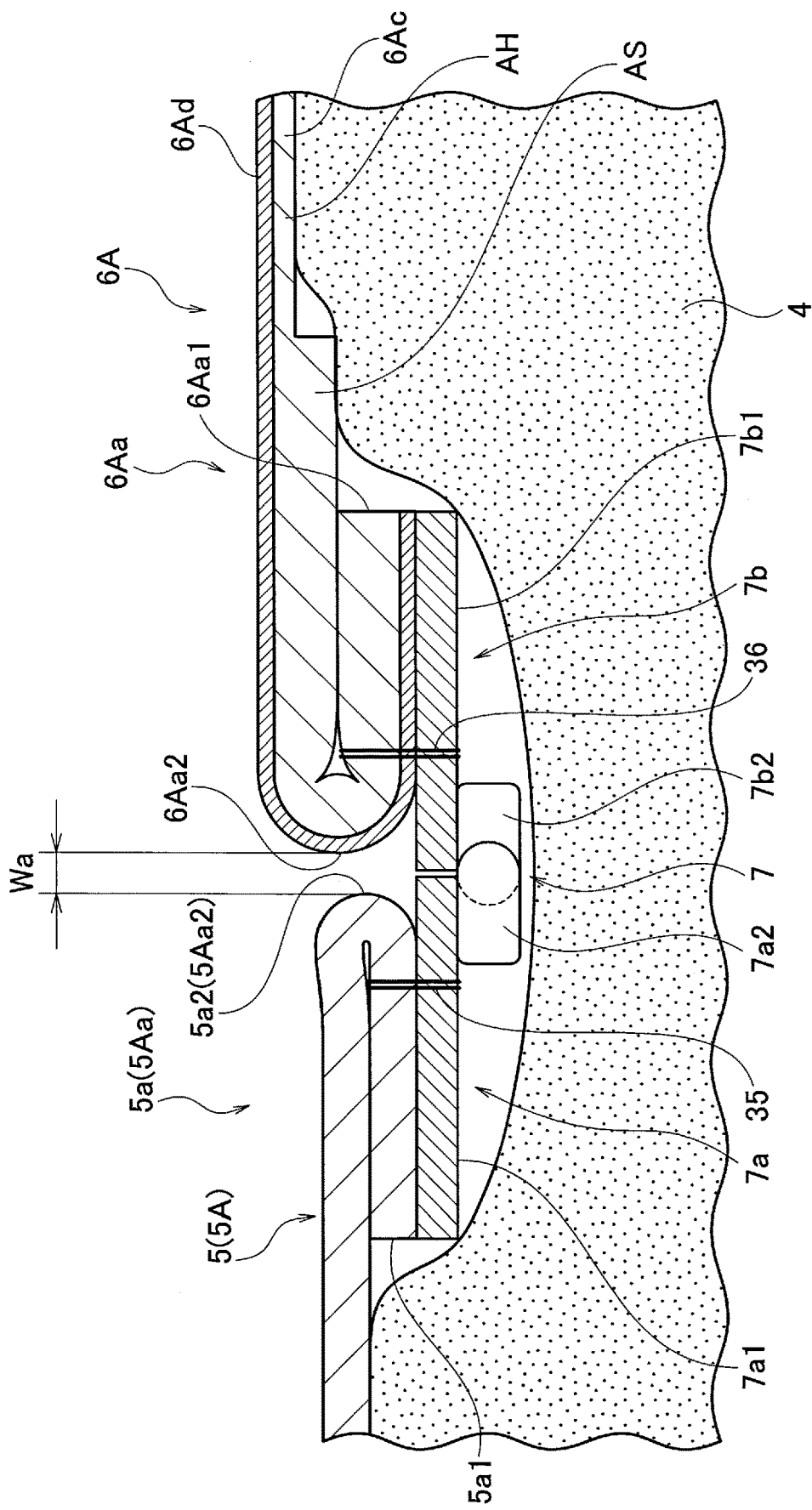
FIG. 11 is a partial cross sectional view for explaining an attachment structure of fasteners 7a, 7b used in the seat 52 equipped with a modified example of the back board 6A.

As shown in FIG. 11, as a modified example, the back board 6A may be made such that the skin extended portion 6Ad1 (FIG. 4) with only the skin material 6Ad is not formed at the edge portion 6Aa, and the weak press portion AS of the base material portion 6Ac is provided. FIG. 12(a), (b) is a diagram for explaining a procedure for attaching the fastener 7b to that edge portion 6Aa.

First, in a prescribed range ARb from an end portion of the edge portion 6Aa, the weak press portion AS is formed along that end portion. The softness level is set to be a softness of a level capable of sewing and folding. When a left and right direction of FIG. 12(a) is taken to be a width direction, a dimension in the width direction of the weak press portion AS (a width dimension in the prescribed range) is set to be sufficiently larger (twice or more, for example) than a dimension in the width direction of the tape portion 7b1.

As shown in FIG. 12(a), to the skin portion 6Ad on a tip end side of the edge portion 6Aa, the tape portion 7b1 of the fastener 7b is sewn by a sewing thread 36, in an orientation in which the element 7b2 becomes an opposite side of the tip end. A position of the sewing thread 36 is a position close to the element 7b2.

Next, as shown in FIG. 12(b), a portion corresponding to the tape portion 7b1 in the weak press portion AS is folded back from the pad 4 side to be reversed, to form the folding portion 6Aa1.

In this state, the fastener 7b becomes possible to be coupled with the fastener 7a provided on the trim cover 5A side. In this modified example of the embodiment 2, the similar effect as the embodiment 2 can be obtained. Also, there is no need to form the skin extended portion 6Ad1 by removing the base material portion 6Ac by the secondary operation, so that the manufacturing cost is reduced.

A vehicle is not limited to an automobile, and can be any moving body equipped with a vehicle body having a seat, which moves with a passenger seated on the seat, such as an airplane, a ship, a railway vehicle, and the like. The attachment of the fasteners 7a, 7b is not limited to the sewing. They may be attached by adhesive and the like.

Industrial Utilizability

The present invention can be utilized as a seat mounted on a vehicle (an automobile, an airplane, a ship, a railway vehicle, and the like), which moves a passenger in a seated state.

While specific embodiments of the invention have been shown and described in detail to illustrate the application of the principles of the invention, it will be understood that the invention may be embodied otherwise without departing from such principles.

The invention claimed is:

1. A vehicle seat comprising a seat back, the seat back comprising:
    a trim cover covering a backrest surface side of a pad of said seat back,
    a back board coupled to said trim cover and covering a back surface side opposite to said backrest surface side of said pad,
    a first fastener, and
    a second fastener, wherein:
    a first folding portion has an edge portion, to be said back surface side of said trim cover, which is folded back to said pad side;
    said first fastener has a first element, in which said first element is attached to said first folding portion to face said pad side;
    a second folding portion has an edge portion, to be said backrest surface side of said back board, which is folded back to said pad side;
    said second fastener has a second element, in which said second element is attached to said second folding portion to face said pad side; and
    said trim cover and said back board are coupled by engaging said first element and said second element, wherein one of:
    said back board comprises a base material portion and a skin portion, said base material portion being integrally connected to said skin portion to form a one-piece back board, said skin portion covering a surface of said base material portion, said base material portion comprising a base material hardness, said skin portion comprising a skin portion hardness, said base material hardness being greater than said skin portion hardness, said skin portion comprising a skin extended portion, said skin extended portion being free of contact with said base material portion, said second folding portion being formed on said skin extended portion; and
    said back board has a weak press portion having a back board thickness, said back board thickness being greater than a thickness of remaining portions of said back board, at an edge portion to be said backrest surface side, and said second folding portion is formed by folding said weak press portion, wherein a level of compression of said weak press portion is less than a level of compression of said remaining portions of said back board.

2. A back board attachment structure in a seat back having a pad, a trim cover covering a backrest surface side of said pad, and a back board covering a back surface side opposite to said backrest surface side of said pad, the back board attachment structure comprising:
    a first folding portion in which an edge portion on said back surface side of said trim cover is folded back to said pad side;
    a first fastener having a first element, in which said first element is attached to said first folding portion to face said pad side;
    a second folding portion in which an edge portion to be said backrest surface side of said back board is folded back to said pad side; and
    a second fastener having a second element, in which said second element is attached to said second folding portion to face said pad side;
    wherein said first fastener and said second fastener are engageable in a state with said trim cover provided from said backrest surface side with respect to said pad and said back board provided from said back surface side with respect to said pad, wherein one of:
    said back board comprises a base material portion and a skin portion, said base material being integrally connected to said skin portion to form a one-piece back board, said skin portion covering a surface of said base material portion, said base material portion comprising a base material hardness, said skin portion comprising a skin portion hardness, said base material hardness being greater than said skin portion hardness, said skin portion comprising a skin extended portion, said skin extended portion being free of contact with said base material portion, said second folding portion being formed on said skin extended portion; and
    said back board has a weak press portion having a back board thickness, said back board thickness being greater than a thickness of remaining portions of said back board, at an edge portion to be said backrest surface side, and said second folding portion is formed by folding said weak press portion, wherein a level of compression of said weak press portion is less than a level of compression of said remaining portions of said back board.

* * * * *